PRESSURE COMMUTATOR MODE SWITCH

Filed Sept. 5, 1968 5 Sheets-Sheet 1

INVENTORS
RICHARD T. CUSICK
WILBUR J. FLEAGLE

BY

J. O. Tresansky
ATTORNEY

INVENTORS
RICHARD T. CUSICK
WILBUR J. FLEAGLE

INVENTORS
RICHARD T. CUSICK
WILBUR J. FLEAGLE

Feb. 10, 1970 R. T. CUSICK ET AL 3,494,175

PRESSURE COMMUTATOR MODE SWITCH

Filed Sept. 5, 1968 5 Sheets-Sheet 4

INVENTORS
RICHARD T. CUSICK
WILBUR J. FLEAGLE

INVENTORS
RICHARD T. CUSICK
WILBUR J. FLEAGLE

United States Patent Office 3,494,175

Patented Feb. 10, 1970

1

3,494,175

PRESSURE COMMUTATOR MODE SWITCH

Richard T. Cusick and Wilbur J. Fleagle, Laurel, Md., assignors, by mesne assignments, to the United States of America as represented by the Secretary of the Navy Filed Sept. 5, 1968, Ser. No. 757,627

Int. Cl. G01m 3/02

U.S. Cl. 73—37 20 Claims

ABSTRACT OF THE DISCLOSURE

Apparatus adapted to be connected in the input pressure lines leading to suitable pressure transducer means in a pressure sampling system in order to perform an integrity check on the system. The apparatus has a switching structure capable of connecting the sampling system in three different operating modes: first, with a predetermined and relatively high purging pressure connected in multiple with the sampled pressure in each input line; second, with the input lines disconnected from the pressures to be sampled and instead connected to different predetermined pressures; and, third, in the straight-through or sampling mode. A tuning cavity for each of the input pressure lines is also provided The structure is used with a so-called pressure commutating or scanning valve whereby a single pressure transducer is sequentially connected to sample the input pressures on a plurality of input pressure lines.

BACKGROUND OF THE INVENTION

During many types of experimental work, it is necessary to periodically sample various pressures. For this purpose, so-called commutating, scanning or sampling valve structures have been proposed for sequentially connecting a plurality of input pressure lines to a single pressure transducer. One type of such a sampling valve structure is described in the U.S. patent of J. C. Pemberton, No. 3,246,-667, issued Apr. 19, 1966. The pressure commutator mode switch, of the present invention, is adapted to be used in combination with such a pressure scanning valve arrangement and permits the rapid and remote testing of the over-all pressure sampling system, including the input pressure sensing lines, both prior to and during the operation mode of the system.

DESCRIPTION OF THE INVENTION

In view of the foregoing, it is proposed in accordance with the present invention to provide a method and apparatus for connecting a pressure sampling system in various testing and operating mode in order, for example, to check the integrity of the input pressure lines and/or pressure commutating or sampling valve of the pressure sampling system. More particularly, it is proposed in accordance with the present invention to provide a switching structure adapted to be connected in the input pressure sensing lines to a pressure commutating valve/transducer and capable of switching the system between a plurality of operating modes. For example, in the preferred embodiment to be described in detail hereinafter, the pneumatic sampling system is switched between the three following modes: a PURGE mode wherein the input pressure lines are connected to a source of relatively high purging pressure so as to perform a check on the integrity of that portion of each input pressure line between the pressure sampling point and the point of application of the higher purging pressure; a CALIBRATE mode wherein the sampled pressures are disconnected and sequentially commutated input pressure lines are connected to sources of different predetermined pressure so as to provide an integrity check on the commutating valve and those portions of the input pressure lines connected between the pressure commutating valve and the mode switch; and, a RUN mode wherein the input pressure lines are connected in a straight-through condition, for applying the pressures to be sampled to the commutator valve.

2

The proposed apparatus of the present invention includes a tuning cavity associated with each input pressure line and perform optimized filtering of the pressure signals and decrease pressure line impedance so that high sampling rates can be achieved. Moreover, the proposed apparatus of the present invention enables the system mode switching structure to be remotely controlled, if desired, by a motor drive unit and a microswitch, for example, which detects the position of the mode switch.

Other objects, purposes and characteristic features of the present invention will in part be pointed out as the description of the invention progresses and in part be obvious from the accompanying drawings, wherein.

Figures 1, 3:
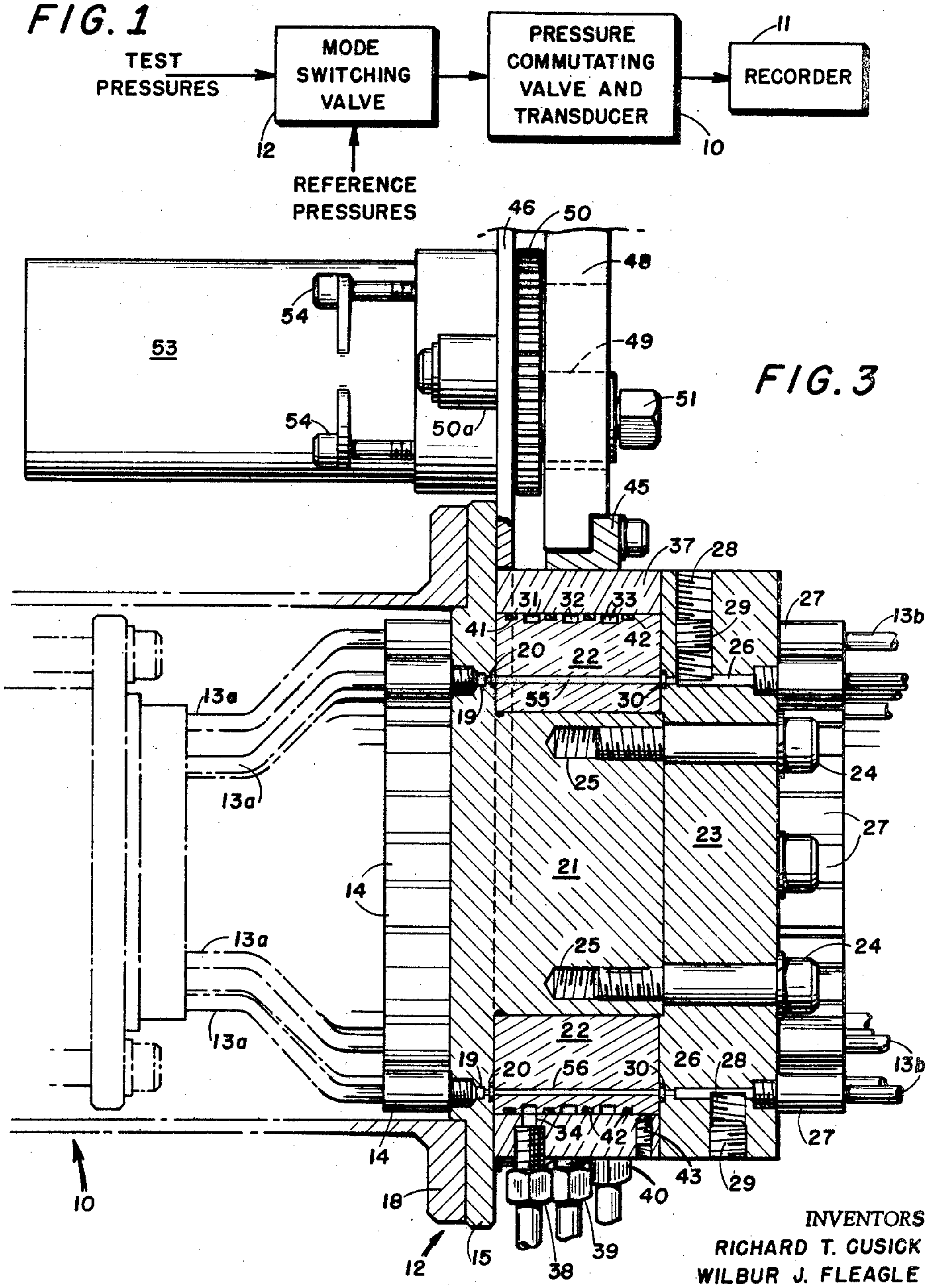
FIG. 1 is a simplified block diagram of a pressure sampling system, in accordance with the present invention.
FIG. 3 is a side plane view, partly in cross-section, of the pressure commutator mode switch apparatus, when taken along line 3—3 in FIG. 2.

Referring now to the drawings, the proposed method and apparatus of the present invention is adapted for use in a pressure sampling system such as that illustrated in FIG. 1, wherein the test pressures or pressures to be sampled are applied to a pressure commutating valve/transducer unit 10 and the output of the transducer is recorded on a suitable recorder 11. The proposed mode switching valve of the present invention is designated at 12 and is adapted to be connected in the input pressure lines, ahead of the commutating or scanning valve unit 10. In addition, certain predetermined reference pressures, to be described in more detail hereinafter, are applied to the proposed mode switching structure 12. As mentioned previously, one form of pressure commutating valve/transducer structure suitable for use, at block 10, is described in the U.S. Patent to Pemberton, No. 3,246,-667. The proposed mode switching apparatus 12 of the present invention enables an operator to perform a remote and rapid check on the integrity of the over-all pressure sampling system and in particular, the integrity of the commutator valve unit 10 and the input pressure lines along which the pressures to be sampled are applied as inputs thereto. For example, the pressure sampling system illustrated in FIG. 1 might be employed to record the pressure profile in a wind tunnel experiment.

In FIG. 3 of the drawings, the pressure scanning or commutating valve unit 10, which might be of the type disclosed in the aforementioned Pemberton patent, is shown in dotted lines and has a plurality of input pressure lines designated at 13*a*. For example, there might be forty-eight input pressure lines 13*a* connected to the scanning valve/transducer unit 10 and the unit 10 would include a single pressure transducer (not shown) which is sequentially connected, by a motor driven rotor, to sample the input lines 13*a*. A typical sampling or scanning rate for the unit 10 might be twenty-four input pressures per second.

The input pressure lines 13*a* to scanning valve unit 10 are connected, by means of threaded couplings 14, into the left-hand flattened surface or face of a flanged mounting plate member 15. Suitable bolt holes 16 are provided adjacent the outside edge of the mounting plate member 15 (see FIG. 4) and receive bolts 17 (see FIG. 2) which secure the mounting plate member 15 to a suitable housing member 18 which surrounds the scanning valve unit 10, as shown in FIG. 3.

Figure 4:
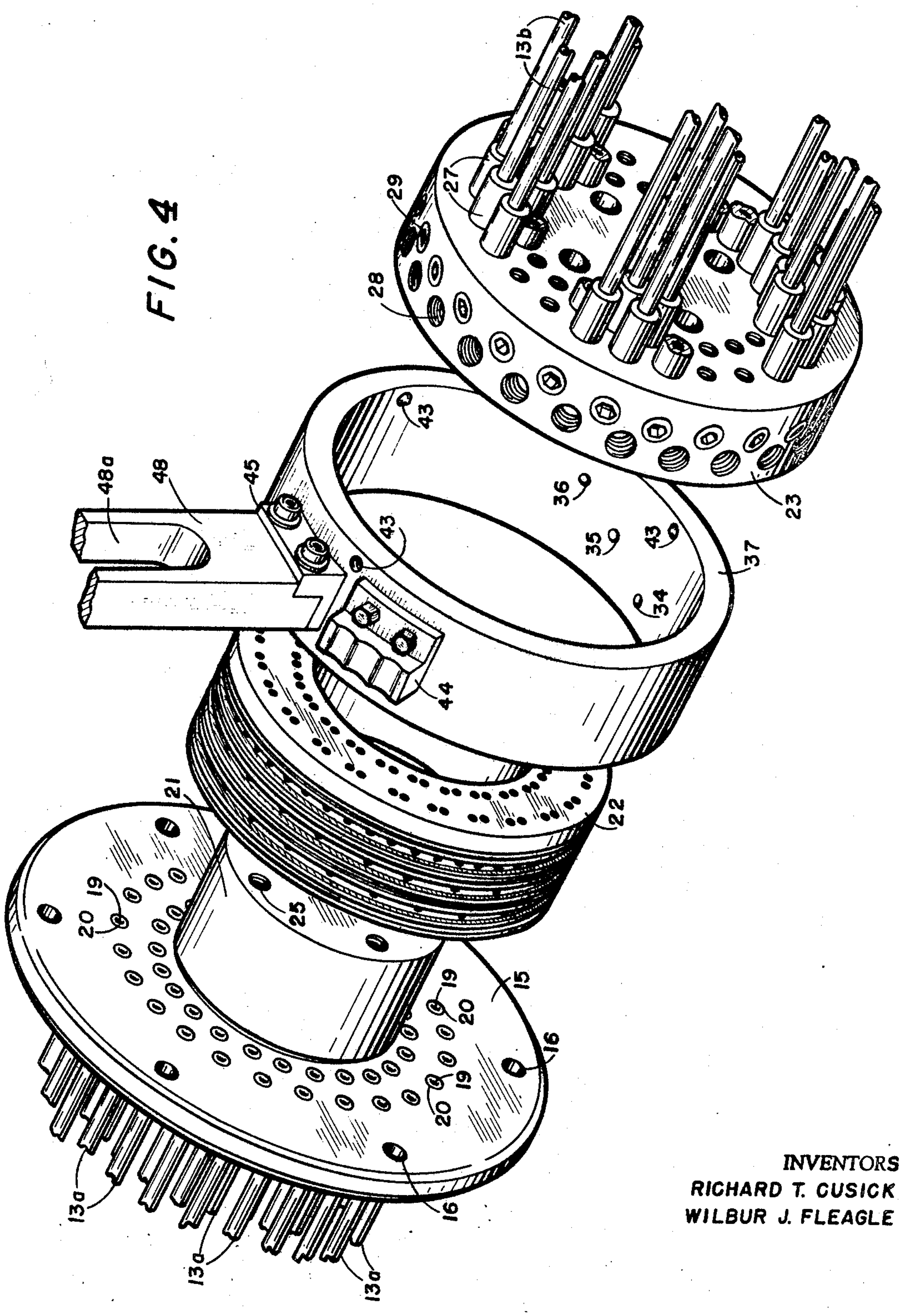
FIG. 4 is an exploded perspective view of the proposed pressure commutator mode switch of FIG. 2, in its disassembled position.
Figure 5:
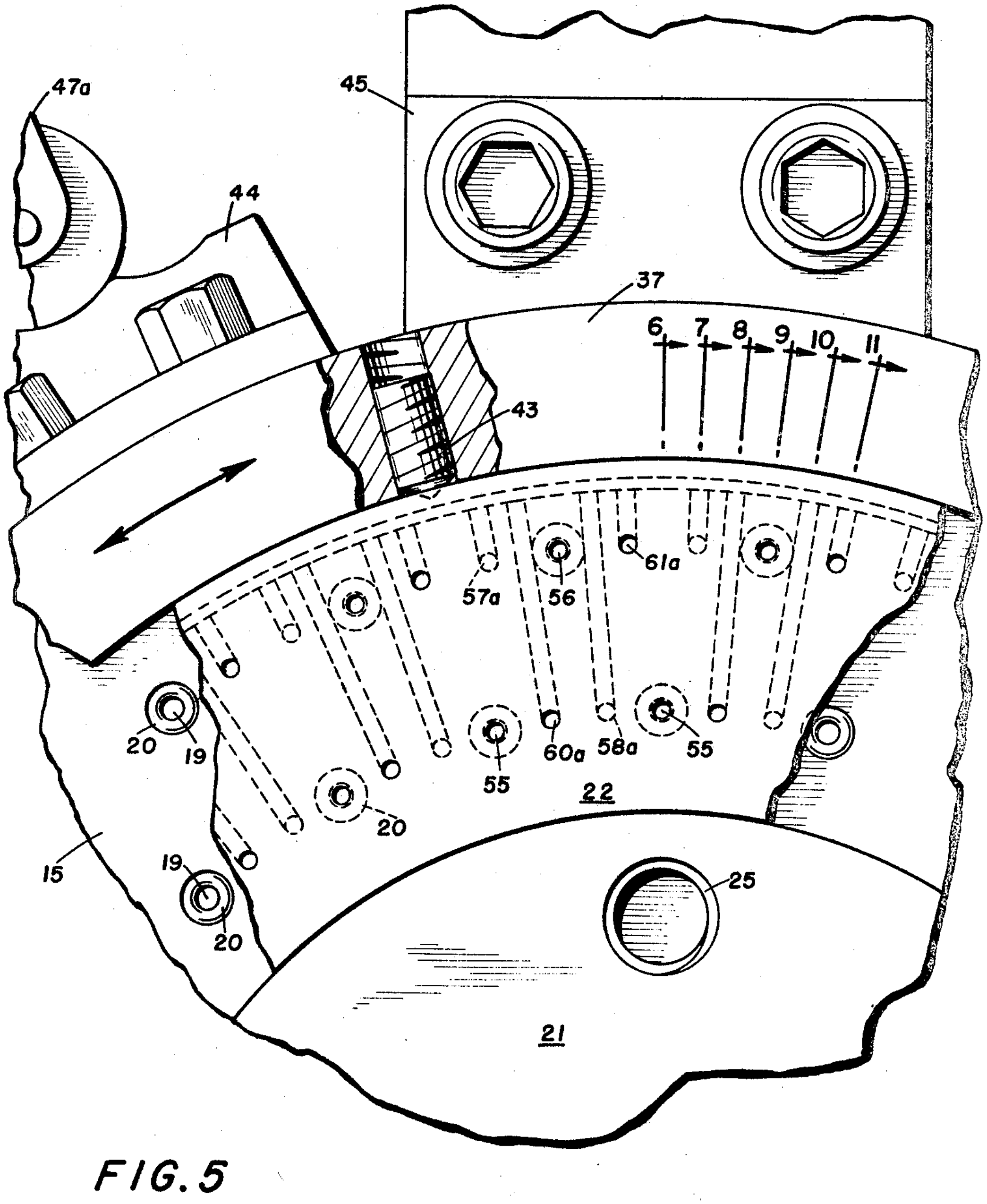
FIG. 5 is an exploded partial front view of the pressure commutator mode switch of FIG. 2, with parts broken away to expose the internal structure.
Figure 6:
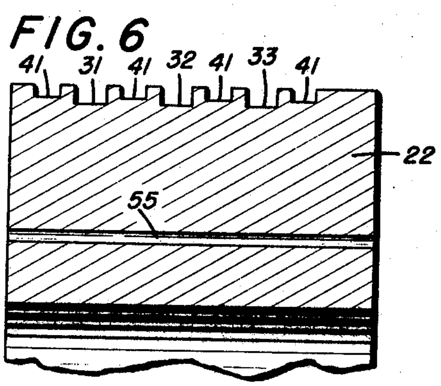
FIG. 6 is a partial sectional view taken along line 6—6 in FIG. 5.

As shown in FIGS. 3 and 4, the mounting plate member 15 is formed with two circular rows of staggered ports or passageways 19 extending between the front and back flattened surfaces of the plate member 15 and communicating with the pressure input lines 13*a* to the scanning valve unit 10. Each of the internal passageways 19 in the mounting plate member 15 is provided with a suitable O-ring 20 seated adjacent the front or right-hand surface of the plate member 15.

The plate member 15 also has a central hub portion 21 which extends to the right in FIGS. 3 and 4 and supports a rotatable, annular member 22, to be described in more detail hereinafter. A stationary manifold plate member 23 is bolted, at 24–25, to the hub portion 21 of the stationary mounting flange plate 15, so that it covers the right-hand surface or face of the rotatable member 22. The stationary manifold plate member 23 is also formed with two circular rows of staggered ports or passageways 26 (see FIG. 3) extending between the right and left-hand flattened surfaces thereof and adapted to be connected, by threaded couplers 27, to input pressure lines 13*b* which lead to the various pressures to be sampled. As shown most clearly in FIG. 4, there is a total of forty-eight input ports in both manifold plate member 23 and stationary mounting plate 15, corresponding to the forty-eight different input pressures capable of being sequentially sampled by the scanning valve unit 10.

Figure 2:
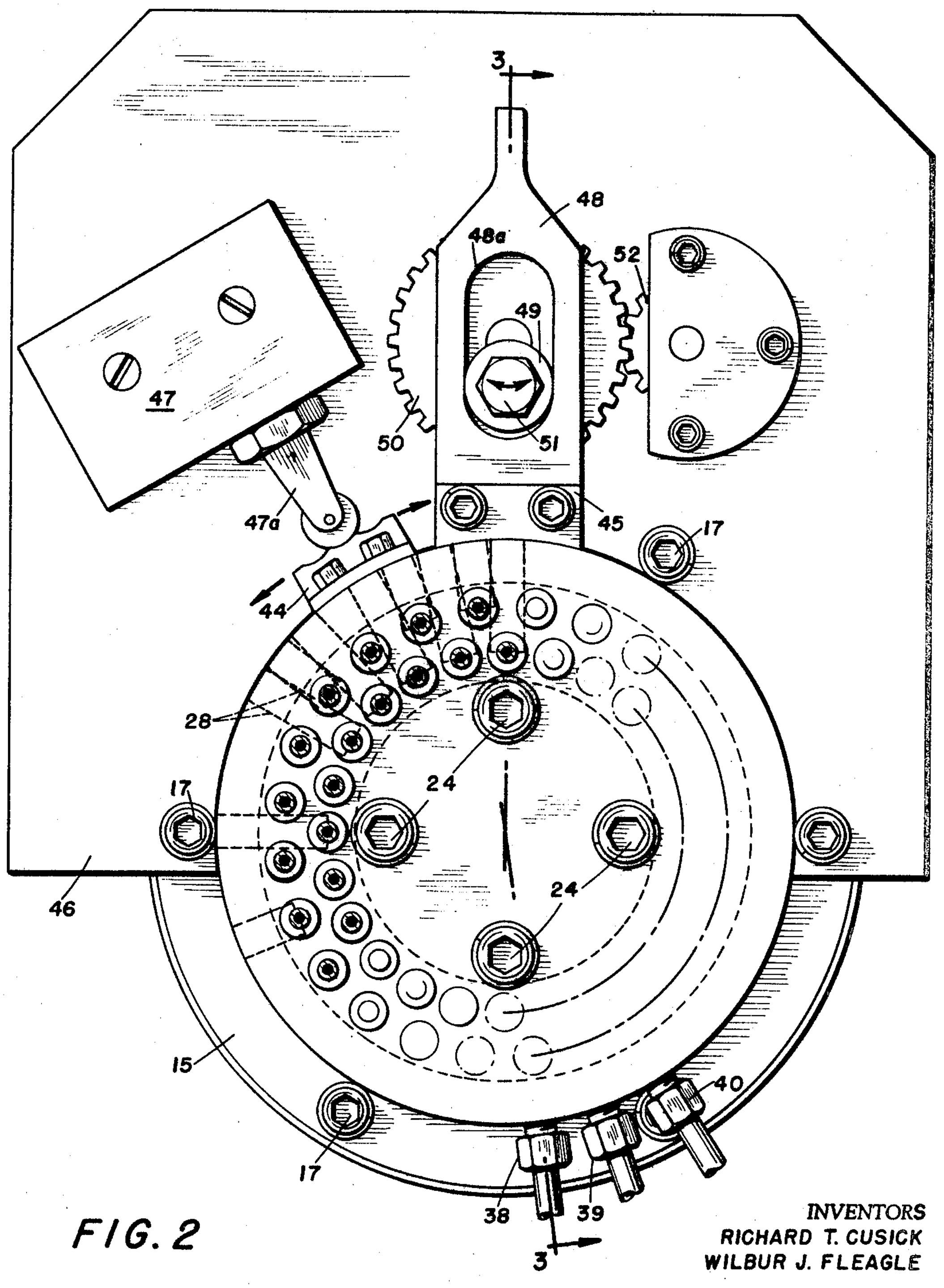
FIG. 2 is a front plane view of one embodiment of the pressure commutator mode switch apparatus proposed by the present invention.

The manifold plate member 23 is provided with two staggered rows of tuning cavities or bores 28 extending radially from each of the internal passageways 26 to the outside edge of the plate member 23, as shown in FIGS. 2, 3 and 4. Each of these tuning cavities 28 is threaded to receive a suitable plug member 29 which is adjusted to perform optimized filtering of the input pressure signal, while maintaining low filter output impedance, as is necessary for rapid scanning of the input pressures. The stationary manifold plate member 23 is also provided with O-rings 30 (see FIG. 3) seated adjacent the left-hand surface or face of plate member 23 in order to form a pressure seal where each of the passageways 26 communicates with the movable member 22.

Referring to FIG. 3, the outer edge of the rotatable member 22 is formed with three spaced slots 31, 32 and 33 which extend around the circumference of the member 22 and communicate with bores 34, 35 and 36 respectively (see FIG. 4) in annular sleeve member 37 which covers the outer edge of the rotatable member 22 when the commutator mode switch of the present invention is in its assembled position. These ports 34, 35, and 36 are connected, by couplings 38, 39 and 40 respectively, to predetermined reference pressures to be described in more detail hereinafter. Moreover, the outer edge of rotatable member 22 is formed with somewhat shallower slots 41, on either side of each of the pressure slots 31, 32 and 33, adapted to receive O-rings 42 which extend around the outside edge of the member 22 to form pressure seals against the sleeve member 37. The members 37 and 22 are secured together, for example, by means of three regularly spaced set screws 43 threaded into the outer sleeve member 37.

Referring now to FIG. 4, a pair of L-shaped brackets 44 and 45 are attached to the outer surface of sleeve 37. The upper edge of the L-shaped bracket 44 is formed with three arcuate indentations spaced angularly from one another with five degrees (5°) separation. This upper edge of bracket 44 is utilized to detect the operating position of the illustrated commutator switch of the present invention. More specifically, mounting panel 46 which is secured to the flange portion of mounting plate member 15 by certain of the bolts 17, carries a microswitch 47 whose actuating arm 47*a* is positioned to engage the upper surface of the L-shaped bracket 44. Consequently, as the annular sleeve 37 and the rotary member 22 are rotated, as will be described in detail hereinafter, between the various operating positions of the mode switch, the microswitch arm 47*a* rolls between the indentations and thereby detects the operating position or mode.

The other L-shaped bracket member 45 is bolted to a toggle arm 48 which can best be seen in FIG. 2. The toggle arm 48 is formed with a central opening 48*a* adapted to receive operating arm 49 which is eccentrically mounted on gear 50 by the bolt 51. The spindle of gear 50 is secured to panel member 46 at 50*a* and the gear 50 meshes with a somewhat smaller drive gear 52 which, in turn, is operated by drive motor 53 (see FIG. 1) secured to the back or left-hand surface of the panel 46 by mounting bolts 54. The motor 53 is effective to rotate the annular sleeve 37 and the attached rotary member 22 to the various operating positions of the proposed mode switch, as will be described in detail hereinafter.

As mentioned previously, each of the stationary plate members 15 and 23 are formed, in the illustrated embodiment, with two circular rows of ports or passageways 19 and 26 respectively. In each of the plate members 15 and 23, the angular displacement between adjacent passageways in each circular row is 15° and the inner and outer circular rows are staggered such that the angular displacement between the inner ports and the outer ports is 7½°. As shown in FIG. 3 of the drawings, the ports 19 and 26 of the plate members 15 and 23 respectively are in-line when the pressure commutator mode switch of the present invention is in its assembled position. However, whether or not port 26 actually communicates with port 19 depends upon the operating position of the rotary member 22.

Figure 7:
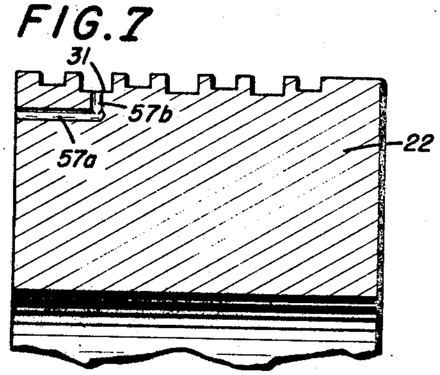
FIG. 7 is a partial sectional view taken along line 7—7 in FIG. 5.
Figure 8:
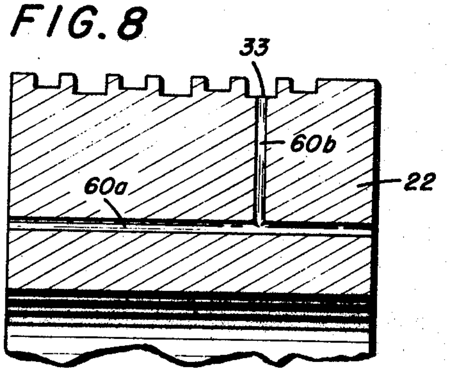
FIG. 8 is a partial sectional view taken along line 8—8 in FIG. 5.
Figure 9:
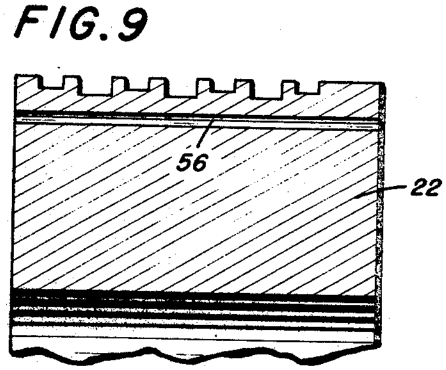
FIG. 9 is a partial sectional view taken along line 9—9 in FIG. 5.
Figure 10:
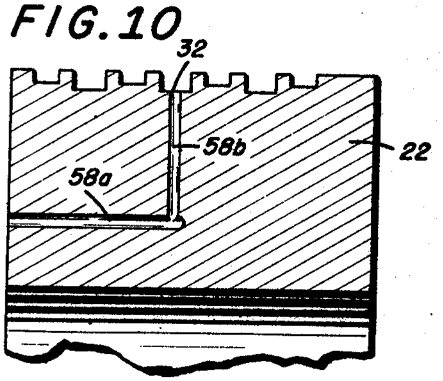
FIG. 10 is a partial sectional view taken along line 10—10 in FIG. 5.
Figure 11:
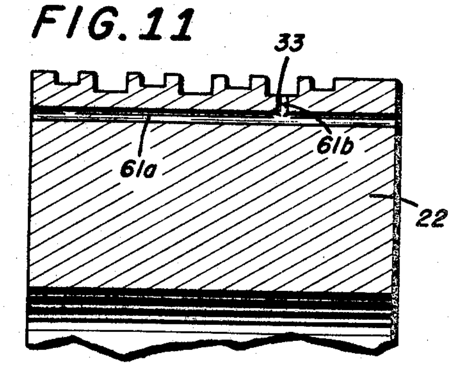
FIG. 11 is a partial sectional view taken along line 11—11 in FIG. 5.

The movable or rotary member 22, on the other hand, is also formed with internal ports or passageways, arranged as shown in FIGS. 5 through 11 of the drawings. More specifically and with reference to the sectional view of FIG. 6, the rotary member 22 is formed with a first or inner circular row of ports or passageways 55 which extend between the front and back flattened surfaces of member 22 and are spaced at 15° from one another. Member 22 is also formed with an outer circular row of similar straight-through ports or passageways 56 (see FIG. 9) which extend between the front and back surfaces of member 22 and are displaced by 15° from one another and from ports 55 by 7½°. At 2½° clockwise from each of the passageways 55, the rotary member 22 is formed with a passageway, comprising portions 57*a* and 57*b*, which communicates with the annular slot or groove 31 in the edge of the member 22, as shown in FIG. 7. Similarly, at 2½° clockwise from each of the outer ports 56, the member 22 is formed with a passageway 58*a–b* communicating with the groove 32, as shown in FIG. 10. Referring now to FIG. 8, 2½° clockwise from each of the passageways 57*a–b* is a passageway configuration including straight-through portion 60*a* and radially extending portion 60*b* which communicates with slot or groove 33 in the member 22. As shown in FIG. 11, at 2½° clockwise from the passageway 58*a–b* is a similar passageway configuration 61*a–b* which also communicates with groove 33 in member 22. It will be noted in FIG. 5 that the various passageways shown in FIGS. 6–11 repeat every 15° of the rotary member 22.

OPERATION

The annular member 22 and its outer sleeve 37 are rotatable about the hub portion 21 of the mounting plate member 15, as previously described, to three different positions or operating modes. In one position, referred as the RUN mode (shown in FIG. 2 and 3), the passageways 55 of member 22 (see FIG. 6) are in alignment with the inner row of passageways 19 and 26 in the members 15 and 23 respectively; whereas, the outer ports 56 of the member 22 (see FIG. 9) are in alignment with the outer row of passageways 19 and 26 in the members 15 and 23. When the motor 53 drives the rotary member 22 5° clockwise from its RUN mode, the rotary member 22 is in its so-called PURGE mode with passageways 60*a* (see FIG. 8) in alignment with the inner passageways 19 and 26 of plate members 15 and 23 respectively; whereas, the passageways 61*a* (see FIG. 11) are in alignment with the outer row of passageways 19 and 26. On the other hand, when the motor 53 operates the rotary member 22 counter-clockwise by 5° from its RUN mode, the member 22 is then in its CALIBRATE position wherein the passageways 57*a* (see FIG. 7) are in alignment with the outer passageways 19 of member 15 and the passageways 58*a* (see FIG. 10) are in alignment with the inner row of passageways 19 in member 15.

With the rotary member 22 in its RUN position, as shown in FIGS. 2 and 3 of the drawings, the input pressures being sampled are applied directly to the commutating or scanning valve/transducer unit 10 via input pressure lines 13*b*, ports 26 in member 23, ports 55 and 56 in rotary member 22, ports 19 in member 15 and pressure lines 13*a*. As mentioned previously, the scanning valve portion of unit 10 then sequentially connects each of the input pressure lines 13*a* to a pressure transducer which, for example, converts each pressure signal to an equivalent electrical signal pulse. The recorder 11 (see FIG. 1) responds to the output pulses of valve/transducer unit 10 and records the value of each of the input pressures being sampled.

When the rotary member 22 is actuated 5° counter-clockwise to its PURGE position, as detected by micro-switch 47, the passageways 60*a–b* (FIG. 8) connect the inner ring of ports 19 and 26, in members 15 and 23 respectively, to the relatively high pressure supplied to groove 33 via coupling 40 and port 36. At the same time, the passageways 61*a–b* (FIG. 11) connect the outer row of ports 19 and 26 to groove 33 and this same relatively high purging pressure. In this mode, the pressure lines 13*a* and 13*b* are purged and a check for clogged pressure sampling lines 13*b* can be made by observing the system output signal trace produced by the recorder 11. More specifically, if any of the input pressure lines 13*b* are clogged, the pressures recorded for those pressure lines will be higher than that recorded for the unclogged pressure lines. In this manner, the operator can rapidly and remotely perform an integrity check on the input pressure lines 13*b*, whenever desirable. Another reason for this purging operation is to prevent the gas being sampled from entering the sampling lines since it could be corrosive and therefore damage the scanning valve 10. Consequently, the purging gas (e.g. nitrogen) is applied to groove 33 and forces any of these corrosive gates from the sampling lines.

In the CALIBRATE mode, wherein the rotary member 22 is moved 5° clockwise from its illustrated position, the ports 57*a–b* (FIG. 7) connect the outer ring of ports 19 in plate member 15 to groove 31 and ports 58*a–b* (FIG. 10) connect the inner ring of ports 19 to the groove 32. The input pressure lines 13*b*, on the other hand, are disconnected from the scanning valve unit 10. As mentioned previously, groove 31 is connected to a predetermined pressure, while groove 32 is vented to atmosphere. Consequentially, as the scanning valve 10 samples the various input pressures on lines 13*a*, the recorder 11 will normally produce a trace containing alternate pulses of the predetermined pressure in groove 31 and the atmospheric pressure of groove 32. However, if one or more of the input lines 13*a* is clogged, the recorder 11 will indicate this fact by recording the absence of the proper pressure level, either the predetermined pressure or atmospheric pressure, for that input. In this manner, the operator can rapidly and remotely check the integrity of the lines 13*a*.

As previously mentioned, the front manifold plate member 23 is also formed with a plurality of tuning cavities 28 (see FIG. 3), communicating with each of the bores 26. More specifically, the threaded plugs 29 are adjusted to perform optimized filtering of the input pressure signals from lines 13*b*, while maintaining the low output impedance necessary for rapid sampling of the input pressures.

Obviously, many modifications, adaptations and alterations are possible in light of the above teachings. Therefore, it should be understood at this time that the invention may be practiced otherwise than as specifically described.

What is claimed is:

1. In a pressure sampling system, the combination comprising:

pressure transducer means, input pressure line means connecting said pressure transducer means to the input pressures to be sampled, and switching means connected to said input pressure line means and operable to a first position wherein said input pressure line means is connected solely to the pressure to be sampled and at least one other position wherein said input pressure line means is connected to a predetermined pressure, so as to perform an integrity check on said input pressure line means.

2. The combination specified in claim 1 further including recorder means for recording the output from said transducer means.

3. The combination specified in claim 1 further including a motor driven means for selectively actuating said switching means between its various positions.

4. The combination specified in claim 1 wherein said transducer means is a single pressure transducer and said input pressure line means is a plurality of input pressure lines and further including pressure commutating means for sequentially connecting said plurality of input pressure lines to said single pressure transducer.

5. The combination specified in claim 4 wherein said switching means is operable to, a first position wherein said input pressure lines are connected solely to the input pressure to be sampled, a second position wherein said input pressure lines are simultaneously connected to the input pressures to be sampled and to a predetermined relatively high pressure, and a third position wherein said input pressure lines are disconnected from said pressures to be sampled and consecutively sampled input pressure lines are respectively connected to different, predetermined pressures.

6. The combination as specified in claim 5 wherein one of said different, predetermined pressures is atmospheric pressure.

7. The combination specified in claim 4 and further including a tuning cavity operably connected in each of said input pressure lines.

8. The combination specified in claim 4 wherein said switching means includes, a first stationary plate member having a plurality of passageways therein extending between the flattened surfaces of said plate member and being connected respectively by pressure lines to said pressure commutating means, a second stationary plate member having a plurality of passageways therein extending between the flattened surfaces of said second plate member and being connected respectively by pressure lines to the pressures to be sampled, and a movable member disposed between said first and second plate members and having a plurality of passageways therein, said movable member being movable between a first position wherein the passageways in said first and second stationary plate members are in communication with each other and at least one other position wherein the passageways of said first plate member are connected to a predetermined pressure.

9. The combination specified in claim 8 wherein, said first plate member is formed with a plurality of radially extending passageways each of which communicates with one of the passageways extending between the flattened surfaces of said first plate member, and further including, a plug means adjustably fitted into each of said radially extending passageways to form a tuning cavity.

10. The combination specified in claim 8 wherein said movable member is movable in a direction perpendicular to the passageways in said first and second stationary plate members and is formed with, a first plurality of passageways extending between said first and second stationary plate members, a second plurality of passageways extending to the edge of said movable member and certain of which communicate with selected ones of said first plurality of passageways and the remainder of which extend to said first stationary plate member, and groove means extending circumferentially about said edge in said movable member and communicating with said second plurality of passageways, and further including, an annular member disposed about said edge to cover said groove means, and means for supplying predetermined pressures to said groove means.

11. The combination specified in claim 10 wherein said groove means comprises three spaced grooves extending circumferentially about said movable means, one of said grooves being supplied with a purging pressure higher than said pressures to be sampled and communicating said purging pressure to said selected ones of said first plurality of passageways in said movable means, and the other two of said grooves being supplied with different predetermined pressures and communicating said different predetermined pressures alternately to the passageways in said first stationary plate member.

12. The combination specified in claim 11 and further including, first sealing means disposed circumferentially about said movable means between said grooves to form a pressure seal between each of said grooves and between said movable member and said annular member, and second sealing means disposed between said movable member and each of said first and second stationary plate member to form a pressure seal about the junction of each of said first plurality of passageways in said movable member with the passageways in said first and second stationary plate members.

13. The combination specified in claim 10 wherein said movable member is movable to, a first position wherein said selected ones of said first plurality of passageways in said movable member are in registry with the passageways in said first and second stationary plate members, a second position wherein said remaining ones of said second plurality of passageways in said movable member are in registry with the passageways in said first stationary plate member, and a third position wherein those passageways of said first plurality in said movable member which are not in communication with any passageway in said second plurality are in registry with the passageways in said first and second stationary plate members.

14. The combination specified in claim 13 further including means for sensing the position of said movable means.

15. The combination specified in claim 8 wherein, said second plate member is formed with a flattened flange portion containing said passageways and a central hub portion, said first plate member is affixed to said hub portion, and said movable member is annular and is rotatably mounted on said hub portion between said first stationary plate member and the flange portion of said second stationary plate member.

16. In a pressure sampling system including a plurality of input pressure lines connecting various pressures to be sampled to pressure transducer means, a method for checking the integrity of said sampling system comprising the steps of, applying a predetermined purging pressure greater than said pressures to be sampled to each of said input pressure lines in order to check the integrity of the portion of said input pressure lines between the point of pressure sampling and the point of application of said relatively high predetermined pressure, and disconnecting said portion of said input pressure lines from said transducer means and applying different predetermined pressures to different ones of said input pressure lines in order to check the integrity of said transducer means and the remaining portion of said input pressure lines between said transducer means and the point of application of said different predetermined pressures.

17. The method specified in claim 16 wherein said pressure sampling system includes a single pressure transducer and a commutator valve for sequentially connecting said input pressure lines to said transducer and wherein two different predetermined pressures are applied to consecutively sampled input pressure lines.

18. The method specified in claim 17 wherein one of said two different predetermined pressures is atmospheric pressure.

19. The method specified in claim 17 further including the step of connecting said input pressure lines to receive only said pressures to be sampled.

20. The method specified in claim 19 further including the step of tuning each of said input pressure lines to filter the pressure signal and ensure rapid sampling.

References Cited

UNITED STATES PATENTS

| | | | |
|---|---|---|---|
| 882,141 | 3/1908 | Cope | 73—40.5 XR |
| 1,681,551 | 8/1928 | Miller | 73—39 |
| 2,918,938 | 12/1959 | Kimball | 137—625.11 |
| 2,947,165 | 8/1960 | Kirchner et al. | 73—37 |
| 3,008,490 | 11/1961 | Angelos | 137—625.11 |
| 3,238,971 | 3/1966 | Cerone | 137—625.11 |
| 3,246,667 | 4/1966 | Pemberton | 137—312 |
| 3,326,046 | 6/1967 | Risher | 73—4 XR |

LOUIS R. PRINCE, Primary Examiner

WILLIAM A. HENRY II, Assistant Examiner

U.S. Cl. X.R.

137—625.11, 625.12, 625.18, 625.46